Nov. 19, 1968     A. H. M. SMULDERS     3,411,750
APPARATUS FOR PRODUCING A RELATIVE LINEAR DISPLACEMENT
BETWEEN A COLUMN AND A BODY
Filed Jan. 6, 1967     3 Sheets-Sheet 3
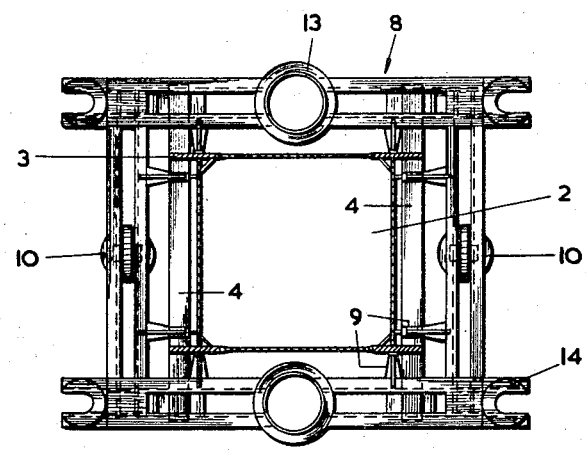
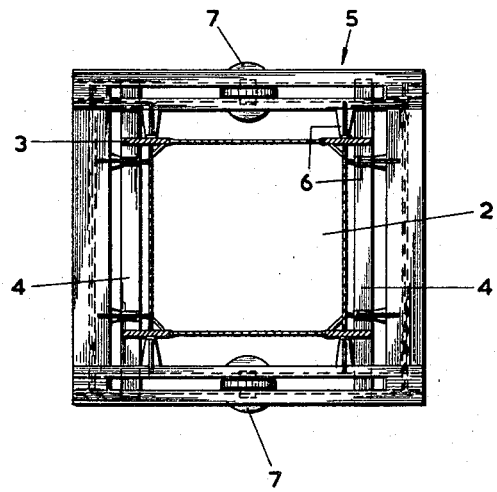
INVENTOR
AUGUST HENDRIK MARIA SMULDERS
BY  Young + Thompson
ATTORNEYS

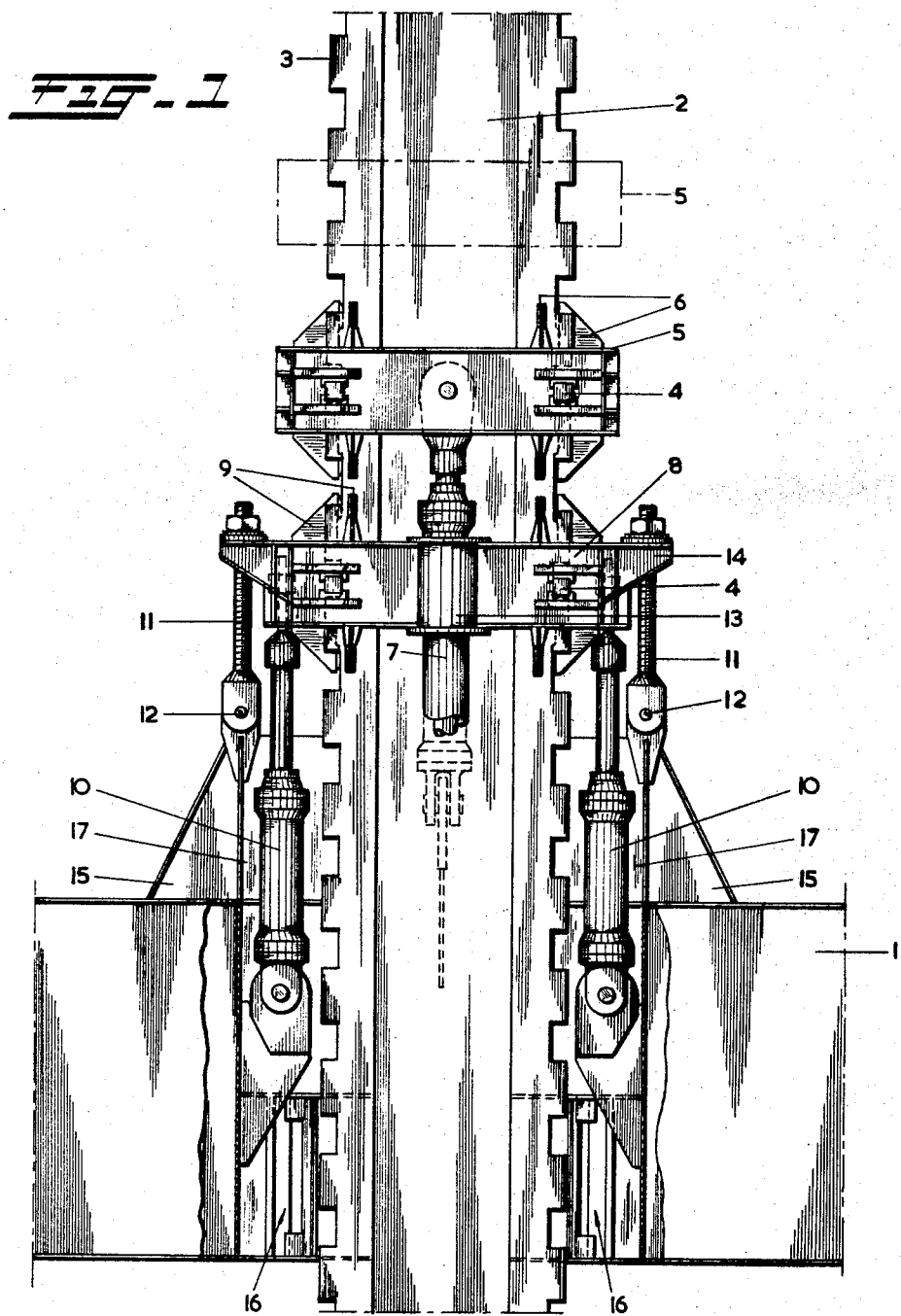

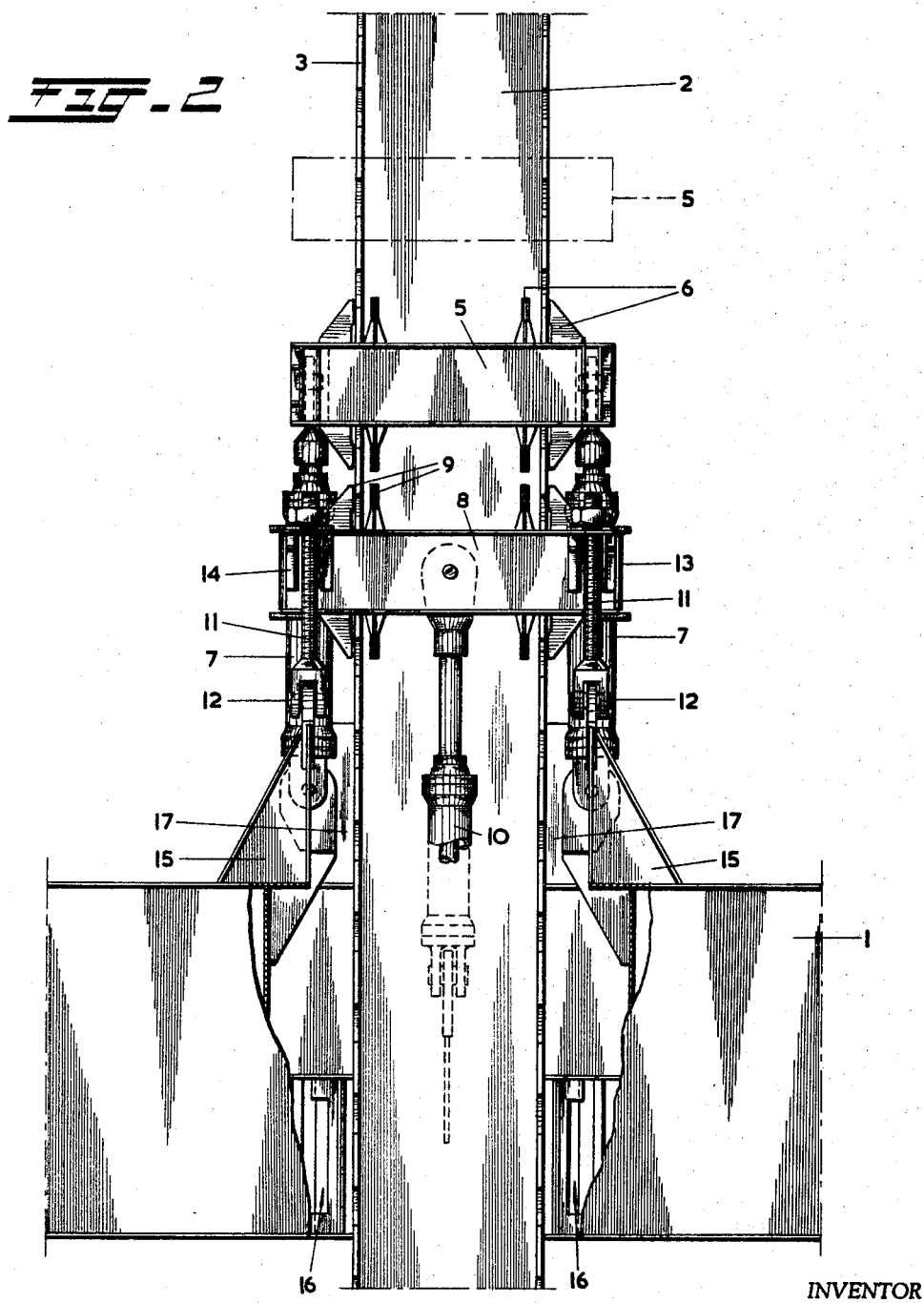

United States Patent Office

3,411,750
Patented Nov. 19, 1968

3,411,750
APPARATUS FOR PRODUCING A RELATIVE LINEAR DISPLACEMENT BETWEEN A COLUMN AND A BODY
August Hendrik Maria Smulders, Wassenaar, Netherlands, assignor to N.V. Werf Gusto v/h Firma, A.F. Smulders
Filed Jan. 6, 1967, Ser. No. 607,704
Claims priority, application Netherlands, Jan. 10, 1966, 6600285
8 Claims. (Cl. 254—110)

ABSTRACT OF THE DISCLOSURE

Means are provided for moving a column and a body relative to each other. The column has outwardly extending teeth on it, and driving pawls are vertically reciprocable and engage with the teeth. Blocking pawls hold the column between movements of the driving pawls. The driving pawls are carried by a first frame that encompasses the column above a second frame that carries the blocking pawls. Oppositely arranged upright hydraulic motors operate the frames, the axes of each pair of motors lying in a vertical midplane of its frame, these midplanes for the two pairs of motors being perpendicular to each other.

---

The present invention relates to apparatus for producing a relative linear displacement between a column and a body, more particularly of the type in which regularly spaced teeth are disposed in series along the length of the column, and driving pawl means and blocking pawl means are alternately engageable with the teeth to move the column and the body vertically relative to each other.

The present invention is particularly well adapted to application in an environment such as that of my U.S. Patent 3,056,858, Oct. 2, 1962. In that patent, the column is rectangular in cross section and has ribs or sides which carry regularly spaced teeth that are perpendicular to the adjacent sides of the column. These teeth engage with a set of driving-and-blocking pawl members in the form of horizontal beams extending parallel to those opposite sides of the column from which the teeth extend perpendicularly. These beams are movable horizontally and are vertically reciprocable by means of hydraulic cylinders.

In the device of that patent, however, the column is guided relative to the body, and the hydraulic motors are supported, by a stand that rises to a considerable height above the body. The cylinders for the operation of the driving pawls and for the operation of the blocking pawls are mounted one above the other and are connected to crossheads that are guided vertically in the stand. Such an arrangement of the cylinders requires that the support be quite high, and this in turn to some extent predetermines the length of the columns with which the apparatus can be used.

Accordingly, it is an object of the present invention to provide such apparatus in which the height of the supporting structure along the column is desirably low.

Another object of the present invention is the provision of such apparatus that will be relatively simple and inexpensive to manufacture, easy to assemble, operate, maintain and repair, and rugged and durable in use.

Other objects and advantages of the present invention will become apparent from a consideration of the following description, taken in connection with the accompanying drawings, in which:

FIGS. 1 and 2 are side elevations, taken from directions spaced apart by 90° of arc, of apparatus according to the present invention;

FIG. 3 is a top plan view of the lower frame; and

FIG. 4 is a top plan view of the upper frame.

Referring now to the drawings in greater detail, there is shown a body 1 which in the illustrated embodiment is in the form of a pontoon. An upright column 2 of considerable length extends through body 1 in a conventional way which may be the same as in the above-identified patent. Column 2 is of large dimensions and is accordingly in the form of a box beam and is rectangular in cross section, preferably square as in the illustrated embodiment.

At each of its corners, column 2 has outwardly extending teeth 3. The teeth 3 are arranged as in the above-identified patent, that is, in the planes of two oppositely disposed sides of the column, and are disposed along the vertical side edges of and perpendicular to the planes of the sides of the column that are between those oppositely disposed sides in the planes of which the teeth 3 lie.

Driving pawl means and blocking pawl means are provided, in the form of horizontal beams or pawls 4. A driving frame 5 is provided in which the driving pawls 4 are horizontally reciprocable perpendicular to their length, by power means (not shown). The frame 5 is rectangular and generally horizontally disposed and encompasses column 2. Bearing shoes 6 are carried by frame 5 and are in sliding engagement with the sides of column 2 adjacent the corners of frame 5 so as to guide the vertical movement of column 2 and frame 5 relative to each other.

Frame 5 is interconnected with body 1 by means of two hydraulic motors 7 of the cylinder and piston type, disposed on opposite sides of column 2. The cylinder of each motor 7 is pivotally interconnected to body 1, and the piston of each motor 7 is pivotally interconnected to frame 5, but these pivotal connections of each motor 7 are perpendicular to each other. In this way, limited vertical swinging movement of column 2 relative to body 1 is accommodated. The axes of motors 7 lie in a common vertical plane which is a midplane of column 2 and frame 5.

A second frame 8 is provided beneath frame 5. Frame 8 carries the blocking pawls 4, which are horizontally reciprocable toward and away from each other by power means (not shown). Frame 8 is rectangular and encompasses column 2 and is vertically movable relative to column 2 and frame 5 and body 1 and is guided for its vertical movement relative to column 2 by means of bearing shoes 9 carried by frame 8 and disposed near the corners of frame 8.

Hydraulic motors 10 are pivotally interconnected at their upper ends to opposite sides of frame 8 and at their lower ends to body 1. Again, the pivotal connections of each motor 10 are perpendicular to each other, to allow limited vertical swinging movement of column 2 relative to body 1. The axes of motors 10 lie in a common vertical plane which is a midplane of frame 5 and column 2. However, this midplane is perpendicular to the midplane defined by the axes of motors 7.

The frames 5 and 8 consist of beams having vertical webs and horizontal upper and lower flanges. The beams themselves have high resistance to bending, but the frame comprised of these beams has relatively little resistance to torsion and accordingly can rack. This is desirable, because the frames can thus adapt themselves to the great machining tolerances of the teeth of the column, so that each of the frames can rack until its associated pawls 4 firmly engage in driving or blocking relationship with a tooth 3 in each of the four corners of the column 2.

Pivotal locking members 11 are mounted for vertical swinging movement on pivot pins 12 on body 1, in order to interconnect body 1 and frame 5 in tension or compression, in order to relieve the strain on the hydraulic motors. In the form shown in FIGS. 1 and 2, the locking members 11 are in tension because the body 1 is imposing downward forces on column 2. It is also to be noted that the cylinders of the fluid motors 7 extend upwardly through frame 8; and to this end, frame 8 is provided with openings 13 in which the cylinders of motors 7 are disposed and which thus provide a support for the motors 7. The frame 8 is provided with brackets 14 for accommodating the upper ends of locking members 11.

A low stand 15 is carried by body 1. Guide members 16 are also carried by body 1 for slidably engaging with the column 2; and guide members 17, carried by stand 15, are similarly slidably engageable with column 2. The locking members 11 are carried by the stand 15, and the lower ends of the hydraulic motors 7 are connected in part to stand 15.

It will of course be understood that the blocking pawls 4 are vertically reciprocable over a distance at least equal to the pitch of the teeth 3, while the driving pawls 4 are vertically reciprocable over a distance equal to at least twice the pitch of the teeth 3, for the reasons and the purposes set forth in the above-identified patent. The frame with the greater range of movement is thus above the frame with the smaller range of movement, while the cylinders of both frames may all be at approximately the same level.

In operation, the driving motors 7 are simultaneously actuated to raise or lower the frame 5 with the associated pawls 4 engaged in the recesses between teeth, thereby to raise or lower column 2, or the body 1, by a predetermined distance which is preferably an even multiple of the pitch of teeth 3. The vertical positions of body 1 and column 2 relative to each other are thus correspondingly changed. At the end of the stroke of the motors 7, the blocking pawls 4 are moved from outer positions within frame 8 to inner positions as shown in FIG. 1, in which latter positions they prevent vertical movement of the body 1 and the column 2 relative to each other. If these blocking pawls 4 are not precisely in register with any gap between teeth 3, then motors 10 are actuated to raise or lower the frame 8 and the blocking pawls 4 a corresponding amount. The blocking pawls 4 are then moved inwardly by the aforementioned power means (not shown). Thereafter, the driving pawls 4 can be disengaged from their teeth and returned to their starting position for imparting another increment of relative vertical movement to the assembly.

Except as described or implied above, the structure and operation of the present invention can be the same as in the above-identified patent.

From a consideration of the foregoing disclosure, therefore, it will be evident that all the initially recited objects of the present invention have been achieved.

Although the present invention has been described and illustrated in connection with a preferred embodiment, it is to be understood that modifications and variations may be effected without departing from the spirit of the invention, as those skilled in this art will readily understand. Such modifications and variations are considered to be within the purview and scope of the present invention as defined by the appended claims.

Having described my invention, I claim:

1. In apparatus comprising a body, a column supported on the body for vertical movement relative to the body, at least one series of regularly spaced teeth on the column parallel to the axis of the column, horizontally movable driving pawl means for engaging the teeth, means for vertically reciprocating the driving pawl means to move the column vertically, horizontally movable blocking pawl means for engaging the teeth, and means for vertically reciprocating the blocking pawl means into registry with the spaces between the teeth; the improvement comprising a first frame encompassing the column and supporting the driving pawl means, and a second frame encompassing the column and supporting the blocking pawl means, said frames being disposed one above the other and being individually vertically reciprocable relative to each other and to the body by said driving pawl reciprocating means and said blocking pawl reciprocating means, respectively.

2. Apparatus as claimed in claim 1, the teeth being disposed on opposite sides of the column.

3. Apparatus as claimed in claim 1, the column and the frames being rectangular.

4. Apparatus as claimed in claim 1, said first frame being disposed above said second frame.

5. Apparatus as claimed in claim 1, said reciprocating means comprising a pair of upright fluid motors connected to said first frame and whose axes are in a midplane of the first frame, and a pair of upright fluid motors connected to said second frame and whose axes lie in a midplane of the second frame, said midplanes being perpendicular to each other.

6. Apparatus as claimed in claim 5, the pair of fluid motors for the upper of the two frames passing through the lower of the two frames.

7. Apparatus as claimed in claim 1, and guide means slidably interconnecting the column and said frames.

8. Apparatus as claimed in claim 1, the column and the frames being rectangular, the teeth being disposed on opposite sides of the column, said first frame being disposed above said second frame, said reciprocating means comprising a pair of upright fluid motors connected to said first frame and whose axes lie in a midplane of the first frame, a pair of upright fluid motors connected to said second frame and whose axes lie in a midplane of the second frame, said midplanes being perpendicular to each other, the pair of fluid motors for the driving pawl frame passing through the blocking pawl frame, and guide means slidably interconnecting the column and said frames.

References Cited
UNITED STATES PATENTS

| 3,056,585 | 10/1962 | Smulders | 254—110 |
| 3,372,907 | 3/1968 | Smulders et al. | 254—110 |

FOREIGN PATENTS

| 934,369 | 8/1963 | Great Britain. | |

OTHELL M. SIMPSON, *Primary Examiner.*